United States Patent [19]
Brown

[11] 3,795,857
[45] Mar. 5, 1974

[54] ELECTRICAL CONNECTOR TESTING APPARATUS HAVING A PLURALITY OF AND GATES

[75] Inventor: Donald C. Brown, Mitcheldean, England

[73] Assignee: Xerox Corporation, Stamford, Conn.

[22] Filed: May 26, 1972

[21] Appl. No.: 257,270

[30] Foreign Application Priority Data
June 11, 1971  Great Britain .................. 27,435/71

[52] U.S. Cl. .................................... 324/51, 324/73
[51] Int. Cl. ............................................ G01r 31/02
[58] Field of Search ........................... 324/51, 66, 73

[56] References Cited
UNITED STATES PATENTS

| | | | |
|---|---|---|---|
| 3,699,438 | 10/1972 | Webb .................................. | 324/51 |
| 3,286,175 | 11/1966 | Gerbier et al. .................... | 324/73 R |
| 3,495,172 | 2/1970 | Davis .................................. | 324/51 |
| 3,689,830 | 9/1972 | Caldwell et al. .................... | 324/51 |

Primary Examiner—Gerard R. Strecker

[57] ABSTRACT

The present invention provides method and apparatus for testing electrical connector apparatus. Preferably, the apparatus is arranged to test a plurality of connectors, and comprises a plurality of sets of apparatus as hereinafter set out, a counter, means responsive to the counter for applying in turn the signal to the first terminal of each of the sets, a single indicator connected to the outputs of all the AND gates, and means responsive to the counter for sampling the indicator during each count and stopping the counter when no output from the appropriate AND gate is received.

1 Claim, 3 Drawing Figures

ELECTRICAL CONNECTOR TESTING APPARATUS HAVING A PLURALITY OF AND GATES

This invention relates to testing apparatus for electrical connectors.

According to the invention there is provided electrical connector testing apparatus comprising an AND gate, an indicator connected to the output of the AND gate, first and second terminals to which the ends of the connectors can be attached, the first and second terminals being connected respectively to the first and second inputs of the AND gate, means for applying a signal to the first terminal, and means biasing the second terminal so that in the absence of a signal applied through the connector to the second terminal from the first terminal no signal appears at the second input of the AND gate.

The invention also includes a method of testing electrical connectors comprising connecting the two ends of the connectors to separate inputs of an AND gate, applying a signal to one end of the connector and biasing the other end of the connector so as to switch the AND off in the absence of the signal applied to said other end through the connector, and indicating the absence of a signal from the output of the AND gate.

Preferably, the apparatus is arranged to test a plurality of connectors, and comprises a plurality of sets of apparatus as set out above, a counter, means responsive to the counter for applying in turn the signal to the first terminal of each of the sets, a single indicator connected to the outputs of all the AND gates, and means responsive to the counter for sampling the indicator during each count and stopping the counter when no output from the appropriate AND gate is received.

Preferably, means are provided for biasing off the first terminals of each set, and conveniently the same biasing means may be provided for biasing off both terminals of one set. Further indicator means may be connected to the first terminals of all the sets, and responsive to bias current from the common biasing means in order to indicate a short circuit between one connector and another.

An example of the invention will now be described with reference to the accompanying drawings, in which.

Figure 1:
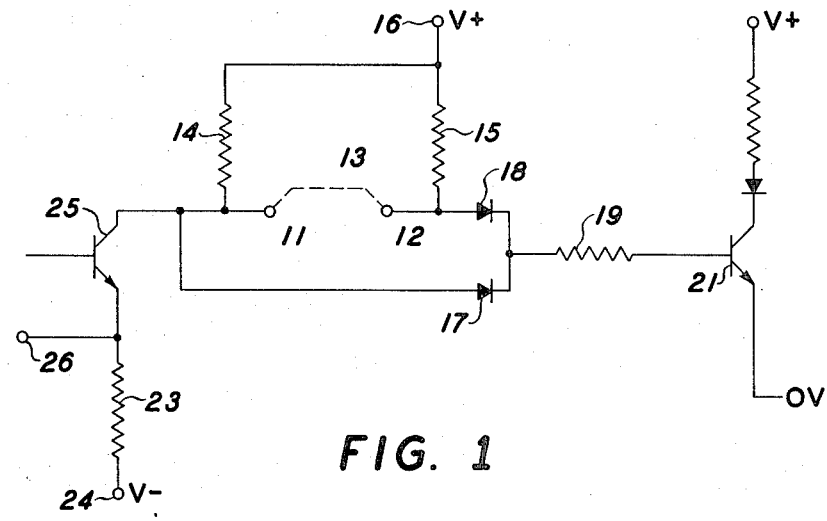
FIG. 1 illustrates the basic circuit testing element.

The basic circuit testing element is shown in FIG. 1 and comprises two terminals 11, 12 for connection to the ends of the connector 13 to be tested. Each terminal is connected through its own load resistor 14, 15 to a positive potential 16. Each terminal is connected through its own diode 17, 18 and by a common resistor 19 to the base of a sensing transistor 21. One terminal 11 is connected through an activating transistor 25 and current sensing resistor 23 to a negative potential 24.

In operation, an activating signal is applied on the base of the activating transistor 25 to switch it on, thus biasing the first terminal 11 negatively. If the connector 13 across the two terminals 11, 12 is continuous, the second terminal 12 will also be biassed negatively. When both terminals 11, 12 are negatively biassed, the sensing transistor 21 is switched off, but if only one terminal is negatively biassed, the transistor 21 remains on. The transistor 21 is sampled during each test, and if the transistor is on, a continuity fault is indicated.

Figure 2:
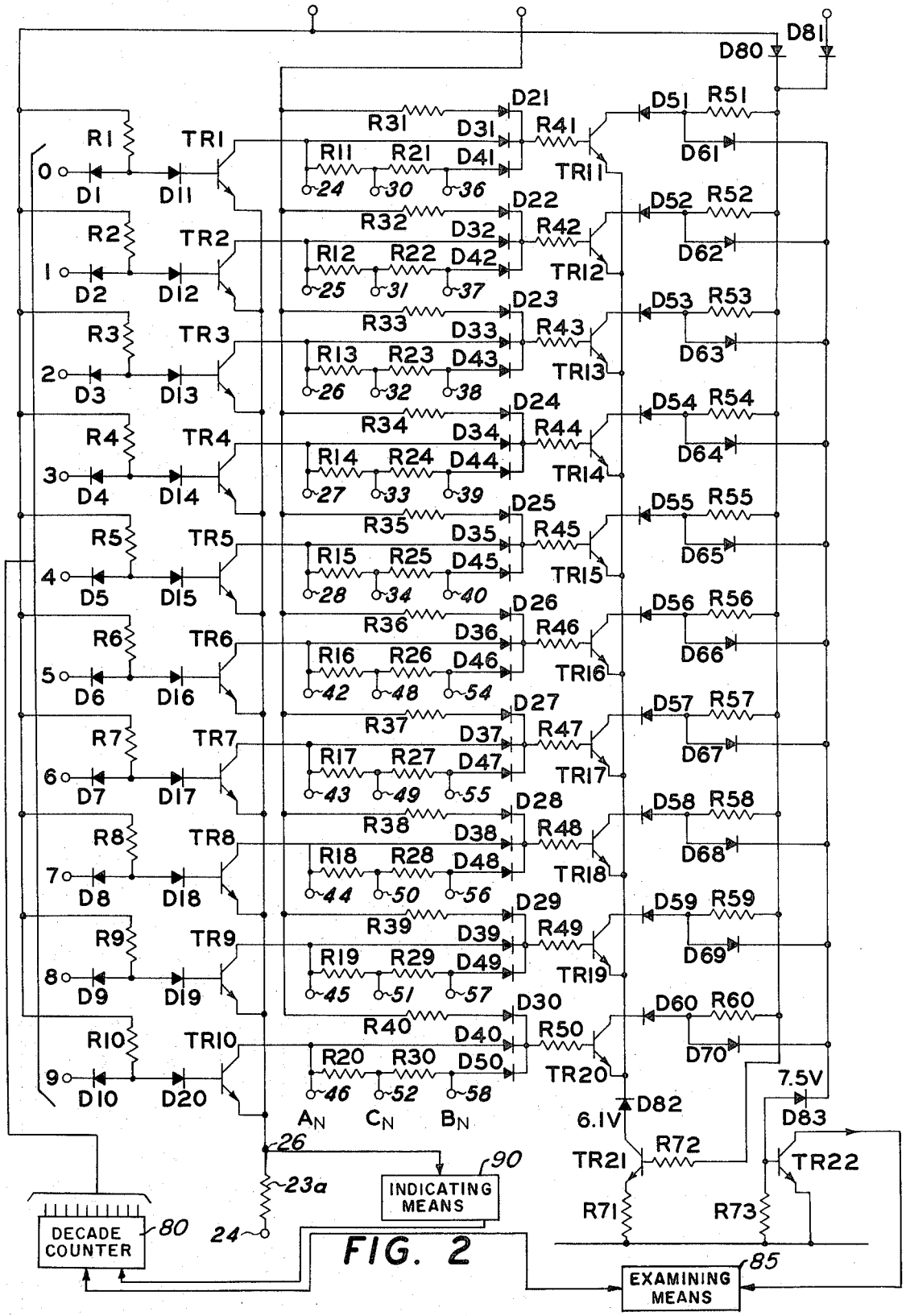
FIG. 2 shows a decade tester incorporating ten basic elements.

FIG. 2 shows ten basic elements connected for testing ten two-ended connectors in succession. The resistor 23a connecting the activating transistors to the negative potential 24 is common to all sets and a common indicating transistor TR22 is connected to the outputs of the sensitizing transistor 21 (referenced TR11-20 in FIG. 2). The terminals 24-28 and 42 to 46 correspond to the first terminal 11; the terminals 30 to 34 and 48 to 52 correspond to the biasing terminals 16; the terminals 36 to 40 and 54 to 58 correspond to the second terminals 12; resistors R11-R20 correspond to the load resistors 14; resistors R21-R30 correspond to the load resistor 15; the diodes D31-D40 correspond to the diode 17; the diodes D41-D50 correspond to the diode 18; the resistors R41-R50 correspond to the resistor 19; the transistors TR11-TR20 correspond to the sensing transistor 21; the transistors TR1-TR10 correspond to the activating transistor 25. The diodes D21-D30 and resistors R31-R40 form part of a test circuit which does not form part of the invention.

A decade counter 80 is used to apply an activating signal in turn to the activating transistors 25 through input terminals 0-9 and the same counter is used to sample the output of the indicating transistor TR22 through examining means 85 while each activating signal is applied. The counter 80 is also arranged to display the number of the connector under test and to stop counting when examining means 85 senses that the indicating transistor TR22 is switched on by one sensing transistor 21 failing to switch off, so that the stopped counter 80 displays the number of the faulty connector.

When there is a cross connection between connectors under test, the current sensing resistor 23a will carry a greater current than that due to the flow through the load resistors 14, 15 of the two terminals 11, 12 of the connector under test as it will also carry the current from the load resistor or resistors connected to the connector to which there is a cross connection. A circuit 90 connected to the current sensing resistor at output 26 senses the increased current and stops the test, indicating a cross-connection fault.

Figure 3:
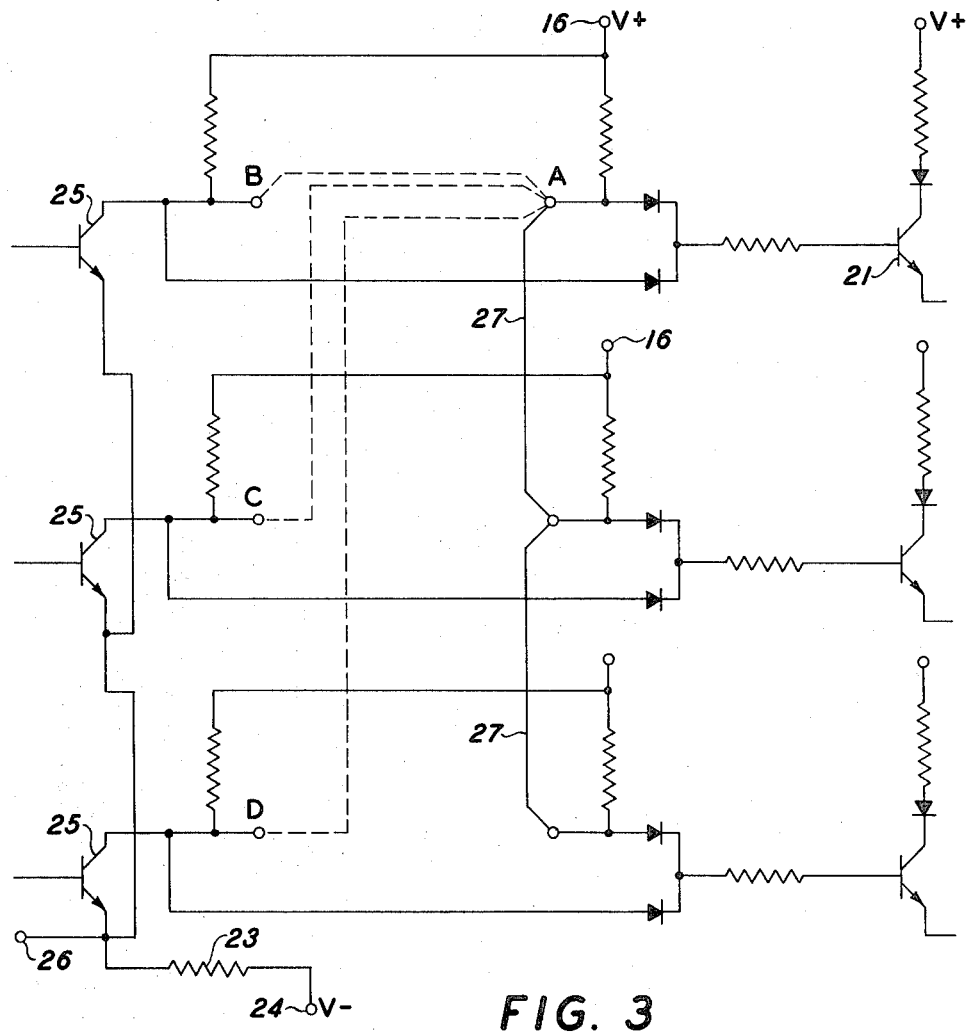
FIG. 3 shows how a multi-end connector is connected into the testing circuit.

When a cross-connection is intended to be present between connectors under test, that is when a connector has three or more ends, the third and any subsequent ends are connected to the first terminals of further elements in the circuit. FIG. 3 illustrates a four end connector, which uses three basic elements. End A is connected to the second terminal of one element and ends B, C and D to the first terminals of the one element and two further elements respectively. Continuity is tested in turn between B and A, C and A, and D and A. The positive potential is removed from terminals 16 in the further elements so that there is no increased current flow in the current sensing resistor 23 due to the cross connections between elements indicating a short circuit fault. In order to prevent an open circuit indication, a connection 27 is made between the second terminals of all the elements to which the multi-end connector is connected so that each sensing transistor can be turned off if there is continuity between the appropriate first terminal and the one second terminal to which the connector is connected.

What we claim is:

1. Electrical connector testing apparatus comprising,
a plurality of first and second test terminals to which the ends of a connector to be tested can be attached,
a plurality of AND gates each having first and second input terminals connected to respective ones of said plurality of first and second test terminals, each AND gate having an output terminal at which a signal will be present only when a signal is present at both input terminals of said each AND gate,
counting means,
means responsive to said counting means for applying in turn a signal to the first input terminal of each AND gate,
first biasing means for biasing the first input terminals of each AND gate so that a signal will only appear at each of the first input terminals of each AND gate when a signal is applied by the signal applying means to the first terminal,
second biasing means for biasing the second input terminals of said plurality of AND gates so that a signal will only appear at each of the second input terminals of each AND gate when a conductive path is present between the first and second test terminals connected to said each AND gate and said signal applying means applies a signal to the respective first input terminal,
a first indicating means connected to the output terminals of all said AND gates for providing a signal when any of said AND gate output terminals has a signal thereon,
means responsive to said counting means for examining said first indicating means signal during each count and stopping said counting means when no first indicating means signal is present, the count at which said counting means is stopped being an indication of which connector has an open circuit, and
a second indicating means connected to the first input terminals of all said AND gates and responsive to a current greater than that normally flowing to any single first input terminal from said first biasing means to indicate a cross connection between two connectors.

* * * * *